Patented Dec. 13, 1949

2,490,958

UNITED STATES PATENT OFFICE 2,490,958

PEST-COMBATING COMPOSITIONS AND SPRAYING LIQUIDS OF ENHANCED ADHERING CAPACITY

Charles Graenacher, Riehen, and Max Matter, Basel, Switzerland, assignors to Ciba Limited, Basel, Switzerland, a Swiss firm No Drawing. Application May 7, 1946, Serial No. 668,022. In Switzerland May 15, 1945

8 Claims. (Cl. 167—42)

The usual method of combating pests on plants is to produce on the plants to be protected a coating which is poisonous to the pest. This method is also applicable in other connections: For example, in stables flies are combated by producing on the walls a coating containing a contact poison so that the flies troublesome to the animals fall to the ground after making contact with the walls. The same method can be used in living rooms for combating mosquitoes, bugs and other pests.

The coating containing the active substance may be produced by dusting powdered preparations, or by spraying liquids containing the active substance. Coatings produced with spraying liquids generally have a considerably better adherence. However, an improvement in the adherence of the sprayed coatings, and therefore in the effective life of such coatings, is an important requirement.

The sprayed coatings are subjected to various influences which make it necessary that they should have good adherence. The most exacting influence is rain; but other weathering influences and also the rubbing together of the sprayed parts of the plants soon cause the coatings to become ineffective.

It has already been proposed to produce sprayed coatings with the aid of aminoplastics capable of being hardened. In this connection, when melamine-formaldehyde condensation products are used, formic acid is added as a hardening agent in such a quantity and such a concentration that it is practically impossible to avoid injury to living plants. It has also been recommended to use hardenable urea-formaldehyde condensation products, if desired, with the addition of small quantities of hardening accelerators, and a certain increase in the adhesion of the coatings is attained in this manner.

The present invention is based on the observation that the adherence of sprayed coatings is increased, quite generally, to a remarkable extent by the use of spraying liquids which contain, in addition to agents for combating pests, hardenable amino-plastics and hardening accelerators, and which have a pH value not lower than 5 and in which the accelerator is present in a proportion amounting to at least 4 per cent. calculated on the total content of non-aqueous constituents in the spraying liquid.

This observation could not be foreseen, because in the known methods for gluing wood in the cold with the use of amino-plastics an increase in amount of accelerator added does not increase the strength of the glued bond. Moreover, it is surprising that, notwithstanding the comparative thickness and extraordinary resistance to rubbing of the coating, the efficacy of the agents for combating pests is entirely maintained.

Furthermore, this invention enables living plants to be effectively protected without injury thereto.

As agents for combating pests there come under consideration both inorganic and organic compounds, which act as fungicides or insecticides or both as fungicides and insecticides, and are insoluble or sparingly soluble in water, for example, copper oxychloride, lead arsenate, barium fluosilicate, sulfur, 4:4'-dichlorodiphenyl-trichloromethyl - methane, 3:6 - dinitromonochlorocarbazole, 2:4-dinitro-thiocyanobenzene, tetramethylthiuram mono- or disulfide and the like, or mixtures of such compounds.

The term "hardenable aminoplastics" is used herein to denote carbamide and melamine derivatives, which are either water-soluble or of limited solubility in water, and which are obtained by the reaction of formaldehyde with compounds containing amino groups such, for example, as urea, thiourea, cyanamide, dicyandiamide, dicyandiamidine, melamine and the like, and also with mixtures of such compounds, and which are converted into a water-insoluble state by the action of hardening accelerators. Of special advantage are the reaction products of formaldehyde with urea, thiourea or melamine. If desired, ethers of the foregoing reaction products may be used.

By aminoplastics of "limited solubility in water" there are intended for the purposes of this invention any colloidal intermediate products which are formed as soon as the condensation is carried beyond the stage of the crystalline methylol compounds. These colloidal intermediate products have the property that they are precipitated from their concentrated aqueous solutions by the addition of water. (Compare, Kolloid-Zeitschrift, vol. LVII [October–December 1931], page 233, left-hand column.)

It will be understood that the hardening accelerators bring about the conversion of the water-soluble aminoplastics after the spraying operation into the water-insoluble state with the formation of resistant coatings. The accelerators must be entirely non-injurious to the substrata to be sprayed, especially to living plants. As accelerators there come into consideration ammonium salts of strong inorganic or organic acids, for example, ammonium chloride, ammonium sulfate, ammonium oxalate, ammonium lactate, and also ammonium salts of organic sulfonic acids. In some cases the desired hardening can be brought about by means of oxidizing agents, for example, potassium persulfate when urea-formaldehyde condensation products are used.

The quantity of the hardening accelerator advantageously amounts to at least one half of the weight of the aminoplastic to be hardened; but the quantity of the accelerator may be many times larger than this lower limit. Advantageously, the hardening accelerator is used in a quantity amounting to at least 4 per cent., and the aminoplastic in a quantity amounting to at least 8 per cent., calculated on the total content of the non-aqueous constituents of the spraying liquid.

The spraying liquid may be prepared in various ways, but in all cases care must be taken that the finished spraying liquid has a pH value not lower than 5, so that injury to living plants is avoided. The agent or agents for combating pests are agitated with water and an aminoplastic, a hardening accelerator, and, if desired, a filling material or characterizing agent, such as kaolin, gypsum or bentonite, or other additions, such as sulfite cellulose waste liquor, cellulose derivatives, wetting agents or adhering agents. Alternatively, a dry pulverulent or a pasty aqueous mixture may first be prepared containing all the ingredients except the hardening accelerator. Preparations of the latter kind are suitable for storage, since they contain no ingredients having a hardening action. The hardening accelerator is added only after agitating the mixture with water. Finally, when pest-combating agents are used which have a hardening action, for example, those of acid reaction, and which may bring about an unfavorable change in the aminoplastic during storage, it is of advantage to mix the pest-combating agent or agents only with the hardening accelerator and any further additions. Such preparations, whether in dry form or in the form of aqueous pastes, are stable during storage. The necessary quantity of the aminoplastic is added only when the spraying liquid is to be prepared. Alternatively, dry preparations stable during storage and ready for use may be prepared, which contain all the necessary ingredients, provided that the ingredients are mixed together in a very dry state and stored under airtight conditions.

The importance of the present invention and the technical advance afforded thereby will be appreciated from the following tests:

One pear tree (Gute Luise) was treated with a spraying liquid prepared as described in Example 1 below, and another tree of the same kind with a spraying liquid prepared in the same manner but without the addition of an aminoplastic. After several months the sprayed coating on the first pear tree was still of the same efficacy. The sprayed coating on the second pear tree was scarcely visible after three weeks. Contact experiments with *Musca domestica* showed that the coating on the leaves of the first pear tree had the same pronounced contact poisoning action three months after the spraying as on the first day thereafter. The contact poisoning action on the leaves of the second pear tree was equally strong on the first day after spraying as it was on the leaves of the first pear tree, but after three weeks the effect had completely disappeared.

Two glass plates of the same size were each sprayed in the same manner as the pear trees. On both plates the contact poisoning action on *Musca domestica* was the same. After subjecting both glass plates to the action of artificial rain for ½ hour, they were allowed to dry. Contact experiments with *Musca domestica* showed that the first glass plate, namely that treated with the spraying liquid containing the aminoplastic, had an equally strong insecticidal action after the rain treatment as before it, whereas the contact poisoning action on the second glass plate had completely disappeared. On the first glass plate there was still a white coating which was very fast to rubbing, whereas the second glass plate was practically washed clean by the rain treatment. The active substance was recovered from the water which initially drained from the second glass plate by extraction with chloroform. By evaporating the chloroform solution in a Petri dish small fine white crystals of 4:4'-dichlorodiphenyl-trichloromethyl-methane were obtained. Flies introduced into the Petri dish showed symptoms of injury after 20 minutes and fell down after about 2 hours. The water which drained from the first glass plate, when extracted in the same manner, did not contain even a very small amount of the active substance, for on evaporation of the chloroform in a Petri dish no small crystals were obtained. Flies remained entirely unpoisoned in the Petri dish for hours.

A spraying liquid of 1 per cent. strength was prepared from a commercial spraying preparation containing 5 per cent. of 4:4'-dichlorodiphenyl-trichloro-methyl-methane. The spraying liquid so prepared was subjected to the tests described above, and it was found that property of adhesion of the coatings obtained therewith corresponded to that of the coatings obtained with the second spraying liquid referred to in the paragraph preceding the last one.

The following examples illustrate the invention, the parts being by weight unless otherwise stated, and the relationship of parts by weight to parts by volume being the same as that of the kilogram to the liter:

*Example 1*

10 parts of 4:4'-dichlorodiphenyl-trichloromethyl-methane are pulverized and mixed with 60 parts of fine kaolin, and the mixture is very finely ground. The fine white powder so obtained is homogoneously mixed with 24 parts of a dry ground condensation product of limited water-solubility from 1 mol of urea and 2 mols of formaldehyde and with 6 parts of dry sulfite cellulose waste liquor powder.

5 parts of the mixture so obtained are stirred with 1 part of ammonium sulfate and 1000 parts of water to form a spraying liquid, and 8 parts of an aqueous solution of 1 per cent. strength of methyl-cellulose are added.

By atomizing the liquid on to living plants or other substrata a white coating is produced, which is strongly insecticidal after very prolonged exposure to rain. Even sensitive plants are not harmed by the spraying treatment.

The condensation product of limited water-solubility may be replaced by the same quantity of powdered dimethylol urea, and instead of ammonium sulfate there may be used ammonium chloride, ammonium nitrate or ammonium oxalate.

*Example 2*

1 part of 4:4'-dichlorodiphenyl-trichlorometh-yl-methane are mixed with 4 parts of kaolin, and very finely ground, advantageously in a cooled disintegrator. 5 parts of the fine homogeneous powder so obtained are mixed with the following dry finely powdered ingredients:

| | Parts |
|---|---|
| Ammonium sulfate | 3.0 |
| Sulfite cellulose waste liquor (dry residue) | 0.4 |
| Sodium di-propylnaphthalene sulfonate | 0.4 |
| Kaolin | 1.2 |

Instead of ammonium sulfate the same quantity of ammonium nitrate may be used.

5 parts of the resulting fine powder, which is absolutely stable to storage and is easily dispersible in water, are stirred with 1 part of dimethylol urea and 1000 parts of water to produce a spraying liquid. By spraying a very wide variety of substrata coatings are obtained, which do not harm living plants and, owing to their excellent adherence, possess an insecticidal action which persists for a very long time.

The above described spraying liquid is especially suitable, for example, for combating potato beetles, *Polychrosis botrana, Clysia ambiguella, Sitona lineata* and stable flies.

The coatings obtained with the spraying liquid have a remarkable fastness to rubbing; it is therefore surprising that the active substance remains fully effective as a contact poison.

By using, instead of 1 part of dimethylol urea, a mixture of 0.8 part of a condensation product of limited water-solubility from 1 mol of urea and 2 mols of formaldehyde with 0.2 part of sulfite cellulose waste liquor (dry residue), or a mixture of 0.8 part of a condensation product of limited water-solubility from 1 mol of melamine and 3 mols of formaldehyde with 0.3 part of sulfite cellulose waste liquor (dry residue), there is obtained a spraying liquid of somewhat better wetting capacity, which likewise produces coatings of excellent adherence and is entirely innocuous to living plants.

*Example 3*

A reaction product from naphthalene sulfonic acid and formaldehyde, obtained by condensation in the presence of sulfuric acid in the manner described in German Patent No. 292,531, is neutralized with an aqueous solution of ammonia, and evaporated. 2 parts of the water-soluble salt so obtained are finely ground, and mixed with 4 parts of copper oxychloride in the form of a fine powder, 0.15 part of pulverized sodium di-isobutyl naphthalene sulfonate and 0.6 part of ammonium sulphate.

The resulting dry powder which is completely stable to storage is stirred with 1 part of dimethylol urea and 1000 parts of water to form a spraying liquid, which when atomized upon living plants produces a coating of very good adherence and good fungicidal action of long duration. The plants are not harmed by the spraying treatment.

*Example 4*

5 parts of ammonium sulfate are mixed with 7 parts of sulfite cellulose waste liquor powder to form a homogeneous mixture and the mixture is finely ground. The resulting powder is then mixed with 84 parts of copper oxychloride and 4 parts of kaolin and the whole is very finely ground.

20 parts of the resulting fine green powder are dispersed while stirring in 1000 parts of water with the addition of 1.7 parts of di-methylolurea, of which the melting point has fallen due to storage to 110–114° C. A spraying liquid is obtained which is very suitable for the treatment of fruit trees before bud swelling. The fruit trees so treated are protected for a long time against fungicidal pests.

*Example 5*

A fine powder is produced by mixing and grinding together the following ingredients:

| | Parts |
|---|---|
| Ammonium salt of 2-hydroxy-3:5-dinitrotoluene | 16.5 |
| Copper oxychloride | 60.0 |
| Ammonium sulfate | 3.5 |
| Ammonium di-isobutylnaphthalene sulfonate | 3.3 |
| Sulfite cellulose waste liquor (dry residue) | 6.7 |
| Kaolin | 10.0 |
| | 100.0 |

A spraying liquid is prepared by dispersing 30 parts of the above powder with 5 parts by volume of a solution of dimethylol thiourea. The resulting spraying solution when applied to fruit trees before bud swelling is active against both the eggs of insects and against fungicidal pests. Owing to the excellent adherence of the copper component protection against fungicidal pests is of especial long duration.

The dimethylol-thiourea solution used for preparing the above spraying liquid may be produced as follows:

0.5 part of magnesium oxide is stirred with 146 parts by volume of a formaldehyde solution of 41 per cent. strength by volume until a weakly alkaline reaction is obtained. 76 parts of thiourea are then added, and the whole is stirred for 1 hour at 40–50° C. After removing a slight turbidity by filtration a water-clear solution of dimethylolthiourea is obtained.

*Example 6*

A powder which can be readily suspended in water is prepared by mixing and grinding the following finely powdered ingredients:

| | Parts |
|---|---|
| Copper oxychloride | 84 |
| Sulfite cellulose waste liquor | 10 |
| Sodium di-isobutylnaphthalene sulfonate | 0.2 |
| A mixture of kaolin and methyl-cellulose in the ratio of 4:1 by weight | 4 |
| Kaolin | 1.8 |
| | 100.0 |

Spraying liquids are prepared consisting of 5 parts of the above described powder, one of the additions Nos. 1–8 described below (in the stated proportions) and 1000 parts of water. The resulting liquids when sprayed on living plants and other substrata yield coatings of excellent resistance to rain. The components of the following additions are advantageously added separately to the spraying liquid.

*Addition No. 1.*—1 part of ammonium sulfate and 0.5 part of a dicyandiamidine-formaldehyde condensation product (prepared in the manner described in United States Patent No. 2,093,651, Example 15 under b).

*Addition No. 2.*—1 part of ammonium sulfate and 0.5 part by volume of a dicyandiamide-urea-formaldehyde condensation product obtained in the following manner:

85 grams of dicyandiamide and 60 grams of urea are stirred with 120 cc. of a hydrochloric acid solution of 37 per cent. strength by volume and 30 cc. of water in a glass flask fitted with a condenser and stirring means and having a capacity of 1 liter for 1 hour at 50–60° C., and then for 6 hours in an oil bath heated at 125–135° C. After cooling the whole to room temperature 180 cc. of a formaldehyde solution of 41 per cent. strength by volume and 70 cc. of water are added. After stirring at 75–85° C. for 6 hours the whole is cooled to room temperature and mixed with 10 cc. of ammonia solution of 25 per cent. strength by volume. After stirring for 2 hours a water-clear solution is obtained, which can be used as such.

Addition No. 3.—0.5 part of ammonium sulfate and 0.7 part of a viscous solution containing 70 per cent. of the dry residue of hexamethylolmelamine-ethylene glycol ether. The latter may be prepared in the following manner:

1500 cc. of formaldehyde solution of 40 per cent. strength by volume having a pH value of 8.5 are heated to 70° C., and condensed, while stirring, with 378 grams of commercial melamine for 15 minutes. 485 cc. of water are then removed by distillation at 40–50° C. under a reduced pressure of 12–15 mm. of mercury. The resulting paste is mixed with 300 cc. of methanol and 744 grams of ethylene glycol, and heated in a reflux apparatus at 85° C. In about 20 minutes the paste dissolves, and is then mixed with 250 cc. of methanol containing 11 cc. of 2N-hydrochloric acid. After further heating at 80–85° C. for 5 minutes the whole is cooled, and the mixture of methanol and water is removed by distillation under reduced pressure until the product has a content of 70 per cent. of dry residue. After adjusting the residue to a pH value of 8.5 by the addition of caustic soda solution a clear, thick syrup is obtained, which can be used as such.

Addition No. 4.—0.5 part of ammonium sulfate and 2 parts by volume of a solution of monomethylolthiourea. The latter is obtained by dissolving 76 grams of thiourea in 80 cc. of formaldehyde solution of 41 per cent. strength by volume (rendered weakly alkaline with caustic soda solution) and 50 cc. of water.

Addition No. 5.—1 part of ammonium chloride and 1.5 parts by volume of a solution of monomethylolurea. The latter is obtained by dissolving 121 grams of urea and 160 cc. of neutralized formaldehyde solution of 41 per cent. strength by volume, and stirring the whole at 45–50° C. for 2 hours.

Addition No. 6.—1 part of ammonium sulfate, 1 part of thiourea and 1.6 parts by volume of formaldehyde solution of 30 per cent. strength by volume.

Addition No. 7.—1 part of potassium persulfate and 1 part of a condensation product of limited solubility in water from 1 mol of melamine and 3 mols of formaldehyde.

Addition No. 8.—0.4 part of ammonium persulfate and 1 part of di-(methoxy-methyl)-urea melting at 98–100° C.

Example 7

A mixture in the form of a paste consisting of:

| | Parts |
|---|---|
| Copper oxychloride | 8 |
| Methyl ammonium sulfomethylate of monooleyldiethylethylene diamine | 0.2 |
| Methyl-cellulose | 0.1 |
| Ammonium sulfate | 1 |
| Thiourea | 2 |
| Water | 30 | is stirred with 1000 parts of water. After the addition of 2.8 parts of para-formaldehyde a spraying liquid is obtained by means of which active coatings can be obtained of excellent resistance to rain.

Example 8

A fine powder is prepared by mixing and grinding together the following ingredients:

| | Parts |
|---|---|
| 2:4-dinitro-thiocyanobenzene | 10 |
| Sulfite cellulose waste liquor | 10 |
| Sodium di-isopropylnaphthalene-sulfonate | 0.2 |
| A finely powdered mixture of kaolin and methylcellulose in the ratio of 4:1 by weight | 4 |
| Kaolin | 40.8 |

The above powder is mixed in a rotary drum with the two following ingredients, which pass a sieve having 15 meshes per linear centimeter and are retained by a sieve which has 27 meshes per linear centimeter: 15 parts of dimethylolurea and 20 parts of ammonium sulfate.

The resulting mixture is completely dried under reduced pressure at 40–45° C., and then charged into moisture-proof packings. The resulting preparation remains unchanged for a long time, and can be used to produce spraying liquids. With spraying liquids of 1 per cent. strength there are obtained on plants and other substrata coatings which are very resistant to rain and are active against fungicidal pests for long periods.

By using, instead of 10 parts of 2:4-dinitrothiocyanobenzene, 10 parts of xanthone or 10 parts of phenothioxine preparations are obtained which are suitable for producing sprayed coatings which remain active for remarkably long periods against animal pests which attack plants.

Example 9

300 parts by volume of a formaldehyde solution of 41 per cent. strength by volume are stirred in a flask provided with a condenser with 1 part of magnesium oxide for ½ hour. After the addition of 120 parts of urea the whole is stirred for 1 hour at 20–30° C., and then for ¾ hour at 70–80° C. The solution is filtered while hot to remove a small quantity of insoluble constituents, and allowed to stand for 20 hours at 0° C. The white mass is then filtered with suction, and the residue is dried at 50° C. under a reduced pressure of 15 mm. of mercury. After grinding a white, water-soluble powder is obtained.

15 parts of the above powder are mixed with 85 parts of a preparation, which is obtained by mixing and grinding together the following finely powdered ingredients:

| | Parts |
|---|---|
| Sulfur | 30 |
| 4 : 4' - dichlorodiphenyl - trichloromethyl - methane | 5 |
| Ammonium sulfate | 20 |
| Sodium di-isobutylnaphthalene sulfonate | 0.2 |
| Sulfite cellulose waste liquor | 4 |
| A mixture of methyl-cellulose and kaolin in the ratio of 1:4 | 4 |
| Kaolin | 21.8 |

The resulting dry powder is after-dried at 50° C. under reduced pressure, and packed in an airtight manner. The preparation is resistant to storage, and is a pale yellow powder which can be easily stirred with water to produce a spraying liquid.

Spraying liquids of 1 per cent. strength made therewith are effective on fruit trees for producing coatings, which are simultaneously effective against scab, red spiders and winter-moth caterpillars.

What we claim is:

1. A composition of matter suitable for the preparation of a spraying liquid, containing as its essential ingredients a pest-combating agent selected from the group consisting of insecticides and fungicides which are sparingly soluble to insoluble in water, an aminoplastic consisting of a hardenable reaction product of formaldehyde with a member of the group consisting of urea, thiourea, cyanamide, dicyandiamide, dicyandiamidine and melamine, and a hardening accelerator consisting of an ammonium salt of a strong acid, the said aminoplastic being present in a proportion amounting to at least 8 per cent. and the hardening accelerator being present in a proportion insufficient to damage horticultural products to which the spraying liquid may be applied but in an amount of at least 4 per cent., both percentages being calculated relative to the total content of non-aqueous constituents of the spraying liquid to be prepared therefrom, which composition gives a spraying liquid having a pH-value of at least 5.

2. A composition of matter according to claim 1, wherein the hardenable aminoplastic is a reaction product of formaldehyde and melamine, and the pest-combating agent is $\alpha:\alpha$-di-(p-chlorophenyl)-$\beta:\beta:\beta$-trichlorethane.

3. A composition of matter according to claim 1, wherein the hardenable aminoplastic is a reaction product of formaldehyde and urea, and the pest-combating agent is $\alpha:\alpha$-di-(p-chlorophenyl)-$\beta:\beta:\beta$-trichlorethane.

4. A composition of matter according to claim 1, wherein the hardenable aminoplastic is a reaction product of formaldehyde and thiourea, and the pest-combating agent is $\alpha:\alpha$-di-(p-chlorophenyl)-$\beta:\beta:\beta$-trichlorethane.

5. The composition in claim 1 in admixture with sufficient water to form a fluid suitable for spraying.

6. The composition in claim 2 in admixture with sufficient water to form a fluid suitable for spraying.

7. The composition in claim 3 in admixture with sufficient water to form a fluid suitable for spraying.

8. The composition in claim 4 in admixture with sufficient water to form a fluid suitable for spraying.

CHARLES GRAENACHER.
MAX MATTER.

REFERENCES CITED

The following references are of record in the file of this patent:

UNITED STATES PATENTS

| Number | Name | Date |
| --- | --- | --- |
| Re. 22,700 | Muller | Dec. 5, 1945 |
| 2,137,465 | Thackston | Nov. 22, 1938 |
| 2,318,121 | Widmer et al. | May 4, 1943 |
| 2,413,624 | Harris | Dec. 31, 1946 |